(12) United States Patent
Sunley et al.

(10) Patent No.: US 11,499,496 B2
(45) Date of Patent: Nov. 15, 2022

(54) ENGINE CONTROL SYSTEM AND METHOD

(71) Applicant: Caterpillar Inc., Peoria, IL (US)

(72) Inventors: Ryan T. Sunley, Washington, IL (US); David A. Pierpont, Dunlap, IL (US); Jason J. Rasmussen, Hopewell, IL (US)

(73) Assignee: Caterpillar Inc., Peoria, IL (US)

( * ) Notice: Subject to any disclaimer, the term of this patent is extended or adjusted under 35 U.S.C. 154(b) by 27 days.

(21) Appl. No.: 15/872,389

(22) Filed: Jan. 16, 2018

(65) Prior Publication Data

US 2019/0218993 A1 Jul. 18, 2019

(51) Int. Cl.
| | | |
|---|---|---|
| *F02D 41/40* | (2006.01) | |
| *F02B 37/12* | (2006.01) | |
| *F02D 41/00* | (2006.01) | |
| *F02B 39/08* | (2006.01) | |

(52) U.S. Cl.
CPC ............ *F02D 41/402* (2013.01); *F02B 37/12* (2013.01); *F02D 41/0087* (2013.01); *F02B 39/08* (2013.01); *F02B 2037/122* (2013.01); *F02D 2200/10* (2013.01)

(58) Field of Classification Search
CPC .. F02D 41/402; F02D 41/0087; Y02T 10/144; F02B 2037/122; F02B 39/08; F02B 37/12
See application file for complete search history.

(56) References Cited

U.S. PATENT DOCUMENTS

| | | | |
|---|---|---|---|
| 5,553,575 A | 9/1996 | Beck et al. | |
| 5,826,425 A * | 10/1998 | Rossi Sebastiano | .. F02M 45/02 60/274 |
| 6,536,209 B2 | 3/2003 | Fluga et al. | |
| 9,488,124 B2 | 11/2016 | Kawabe et al. | |
| 9,523,319 B2 | 12/2016 | Wilson | |
| 2003/0160455 A1 | 8/2003 | Hu et al. | |
| 2005/0188948 A1* | 9/2005 | Miura | ................. F02D 41/0002 123/299 |
| 2006/0005804 A1* | 1/2006 | Kuo | ...................... F02B 17/005 123/295 |

(Continued)

FOREIGN PATENT DOCUMENTS

| | | | | |
|---|---|---|---|---|
| EP | 1363009 A1 * | 11/2003 | ............. | F01N 3/035 |
| EP | 1491740 A1 * | 12/2004 | ................ | F02B 1/12 |

(Continued)

*Primary Examiner* — Phutthiwat Wongwian
*Assistant Examiner* — Joshua Campbell
(74) *Attorney, Agent, or Firm* — Xsensus, LLP

(57) ABSTRACT

A method for controlling an engine in response to an increase in a load on the engine is disclosed. The engine includes a cylinder with a piston slidably disposed therein between a top dead center position and a bottom dead center position. The cylinder and the piston define a combustion chamber. The method includes initiating a first injection event and a second injection event. The first injection event includes introducing a first predetermined quantity of fuel into the combustion chamber at least 5 degrees before the piston reaches the top dead center position. The second injection event includes introducing a second predetermined quantity of fuel into the combustion chamber not earlier than 30 degrees after the piston moves away from the top dead center position.

17 Claims, 4 Drawing Sheets

(56) References Cited

U.S. PATENT DOCUMENTS

| | | | |
|---|---|---|---|
| 2006/0168945 A1 | 8/2006 | Samad et al. | |
| 2009/0164101 A1* | 6/2009 | Kageyama | F02D 41/3836 |
| | | | 701/103 |
| 2011/0023824 A1 | 2/2011 | Asai | |
| 2011/0239987 A1* | 10/2011 | Maehara | F01L 1/181 |
| | | | 123/406.46 |
| 2014/0014062 A1* | 1/2014 | Yacoub | F02D 13/0257 |
| | | | 123/295 |
| 2014/0015257 A1* | 1/2014 | Dobbs | F02D 41/0007 |
| | | | 290/40 B |
| 2016/0068167 A1* | 3/2016 | Wildgruber | B60W 20/10 |
| | | | 701/22 |
| 2016/0201617 A1* | 7/2016 | Ge | F02B 37/162 |
| | | | 60/599 |
| 2016/0298557 A1* | 10/2016 | Bjurman | F02D 17/02 |

FOREIGN PATENT DOCUMENTS

| | | | | |
|---|---|---|---|---|
| WO | 2011008706 | | 1/2011 | |
| WO | WO-2012137055 A1 * | | 10/2012 | F02D 13/0215 |

* cited by examiner

ENGINE CONTROL SYSTEM AND METHOD

TECHNICAL FIELD

The present disclosure relates to an internal combustion engine. More particularly, the present disclosure relates to a system and a method for controlling an internal combustion engine in response to an increase in a load on the internal combustion engine.

BACKGROUND

Internal combustion engines, such as diesel engines have been widely applied as prime movers for machines, generators, marine applications, and other mobile equipment. Such engines are often susceptible to sudden, transient load demands, e.g., during traction control events in a machine, or during sudden surges or changes in a power demand in generators. More specifically, achieving an appropriate and efficient transient response from an engine when the engine is at a no load condition (or a low load condition) remains a difficulty. One reason for such a difficulty is the lack of a sufficient energy supply to the engine, resulting in a less than desirable engine performance.

In some existing strategies of controlling transient response in an engine, the engine may produce increased emissions as compared to a response during a steady-state operation. This is because transient loads may change faster than the engine can actually respond, and may in turn cause a drop in an air-fuel ratio (in a load increasing situation) associated within the engine. A drop in the air-fuel ratio increases a temperature of an engine exhaust, thus generating increased oxides of Nitrogen (NOx). The lowered air to fuel ratio also decreases the combustion efficiency, which in turn produces higher levels of particulate matter (PM).

U.S. Pat. No. 9,523,319 relates to raising temperatures of an exhaust gas stream produced by an internal combustion engine for facilitating regeneration of one or more components of an aftertreatment system.

SUMMARY OF THE INVENTION

In one aspect, the disclosure is directed towards a method for controlling an engine in response to an increase in a load on the engine. The engine includes a cylinder having a piston slidably disposed therein between a top dead center position and a bottom dead center position. The cylinder and the piston define a combustion chamber. The method includes initiating a first injection event and a second injection event. The first injection event includes introducing a first predetermined quantity of fuel into the combustion chamber at least 5 degrees before the piston reaches the top dead center position, while the second injection event includes introducing a second predetermined quantity of fuel into the combustion chamber not earlier than 30 degrees after the piston moves away from the top dead center position.

In another aspect, the disclosure relates to a control system for controlling an engine in response to an increase in a load on the engine. The engine includes a cylinder having a piston slidably disposed therein between a top dead center position and a bottom dead center position. The cylinder and the piston define a combustion chamber. The control system includes a controller that is configured to initiate a first injection event and a second injection event. The first injection event includes introducing a first predetermined quantity of fuel into the combustion chamber at least 5 degrees before the piston reaches the top dead center position, while the second injection event includes introducing a second predetermined quantity of fuel into the combustion chamber not earlier than 30 degrees after the piston moves away from the top dead center position.

In yet another aspect, the disclosure is directed to an engine system. The engine system includes an engine and a controller. The engine includes a cylinder having a piston slidably disposed therein between a top dead center position and a bottom dead center position. The cylinder and the piston define a combustion chamber. The controller is configured to detect an increase in a load of the engine. Further, the controller is configured to initiate a first injection event and a second injection event. The first injection event includes introducing a first predetermined quantity of fuel into the combustion chamber at least 5 degrees before the piston reaches the top dead center position. The second injection event includes introducing a second predetermined quantity of fuel into the combustion chamber not earlier than 30 degrees after the piston moves away from the top dead center position, and not later than 70 degrees after the piston moves away from the top dead center position.

DETAILED DESCRIPTION

Figure 1:
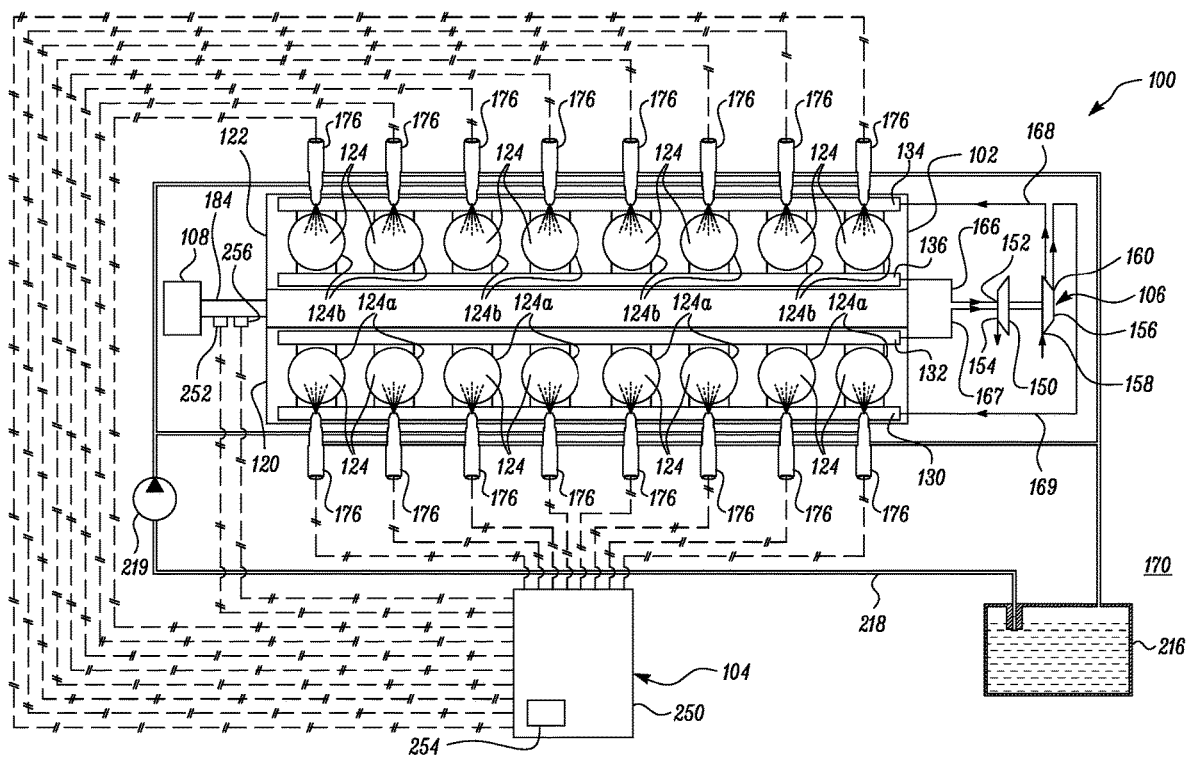
FIG. 1 is a schematic view of an exemplary engine system, in accordance with an embodiment of the disclosure.

Referring to FIG. 1 an engine system 100 is illustrated. The engine system 100 may be coupled to an electrical generator 108 to produce electrical power, for example, in electric power standby applications. Alternatively, the engine system 100 may be applied to power variety of machines, such as, but not limited to, trucks, locomotives, construction machines, ships, and other similar machines known in the art. The engine system 100 includes an engine 102 and a control system 104. The engine 102 includes a turbocharger 106. One aspect of the control system 104 is to control the engine 102 in response to an increase in a load on the engine 102.

The engine 102 may be an internal combustion engine, and may be configured to work on a compression ignition cycle. For example, the engine 102 may be a diesel engine that may receive fuel, such as diesel fuel, for combustion and power generation. However, an engine using other fuels, such as gaseous fuels, including but not limited to propane gas, hydrogen gas, natural gas (methane), or other fuels, singularly or in combination with each other, or with the diesel fuel, may be applicable. Further, the engine 102 may be a multi-cylinder engine. According to one example, the engine 102 may include a V-configuration with twin cylinder banks, as shown, and each cylinder bank may include multiple cylinders. It may be appreciated that a configuration, type, and specification of the engine 102, as discussed in the present disclosure so far, is set out to explain one possible embodiment of the engine 102, and thus, variations to the engine 102, in actual practice and application, may occur. Moreover, the V-configuration of the engine 102 as disclosed is exemplary as well, and, therefore, engines having various other configuration, such as an in-line configuration, may also make use of one or more aspects of the present disclosure.

The engine 102 may include a first cylinder bank 120 and a second cylinder bank 122, and, for example, cylinders included in the first cylinder bank 120 may be referred to as first cylinders 124a and cylinders included in the second cylinder bank 122 may be referred to as second cylinders 124b. In an example, the engine 102 may be a sixteen-cylinder engine with each of the first cylinder bank 120 and the second cylinder bank 122 including eight cylinders, as shown. A number of the cylinders applied, however, may be more or less, depending upon particular engine application. Each of the first cylinder bank 120 and the second cylinder bank 122 may include an intake manifold and an exhaust manifold. For example, the first cylinder bank 120 includes a first air intake manifold 130 and a first exhaust manifold 132, and the second cylinder bank 122 includes a second air intake manifold 134 and a second exhaust manifold 136.

For combustion within the engine 102, air may be supplied to the first cylinders 124a through the first air intake manifold 130, and to the second cylinders 124b through the second air intake manifold 134. It may be noted that the air received by the first cylinders 124a and the second cylinders 124b may be initially compressed by the turbocharger 106. Further, exhaust gas produced within the first cylinders 124a and the second cylinders 124b from combustion may be discharged to the first exhaust manifold 132 and the second exhaust manifold 136, respectively.

The turbocharger 106 includes a turbine portion 150 with a turbine inlet 152 and a turbine outlet 154, and a compressor portion 156 with a compressor inlet 158 and a compressor outlet 160. The turbine portion 150 may be coupled to the compressor portion 156. Further, the turbine inlet 152 may be fluidly coupled to both the first exhaust manifold 132 and the second exhaust manifold 136 respectively via a first exhaust line 166 and a second exhaust line 167. The compressor inlet 158 may receive ambient atmospheric air after passing through a filter (not shown) to remove entrained debris. The compressor outlet 160 may be fluidly coupled to both the first air intake manifold 130 and second air intake manifold 134 respectively via a first air inlet line 168 and a second air inlet line 169. The turbine portion 150 may be driven by a flow of the exhaust gas received from the first exhaust manifold 132 and the second exhaust manifold 136, and the compressor portion 156 may be driven by the turbine portion 150, during operation.

In operation, the turbine portion 150 may drive the compressor portion 156, in turn enabling the compressor portion 156 to produce suction at the compressor inlet 158, thus drawing in air from an ambient environment 170. The drawn-in air is compressed and delivered into the first cylinders 124a and the second cylinders 124b respectively through the first air intake manifold 130 and the second air intake manifold 134. In some embodiments, the turbocharger 106 may include a configuration other than what has been disclosed and/or depicted. For example, the turbocharger 106 may include a multi-staged configuration or a series/parallel configuration.

Further, the engine 102 may include a plurality of fuel injectors 176. For example, one fuel injector 176 may be positioned within each of the first cylinders 124a and the second cylinders 124b. In that manner, fuel may be injected into each of the first cylinders 124a and the second cylinders 124b for mixing with the compressed air for combustion.

Figure 2:
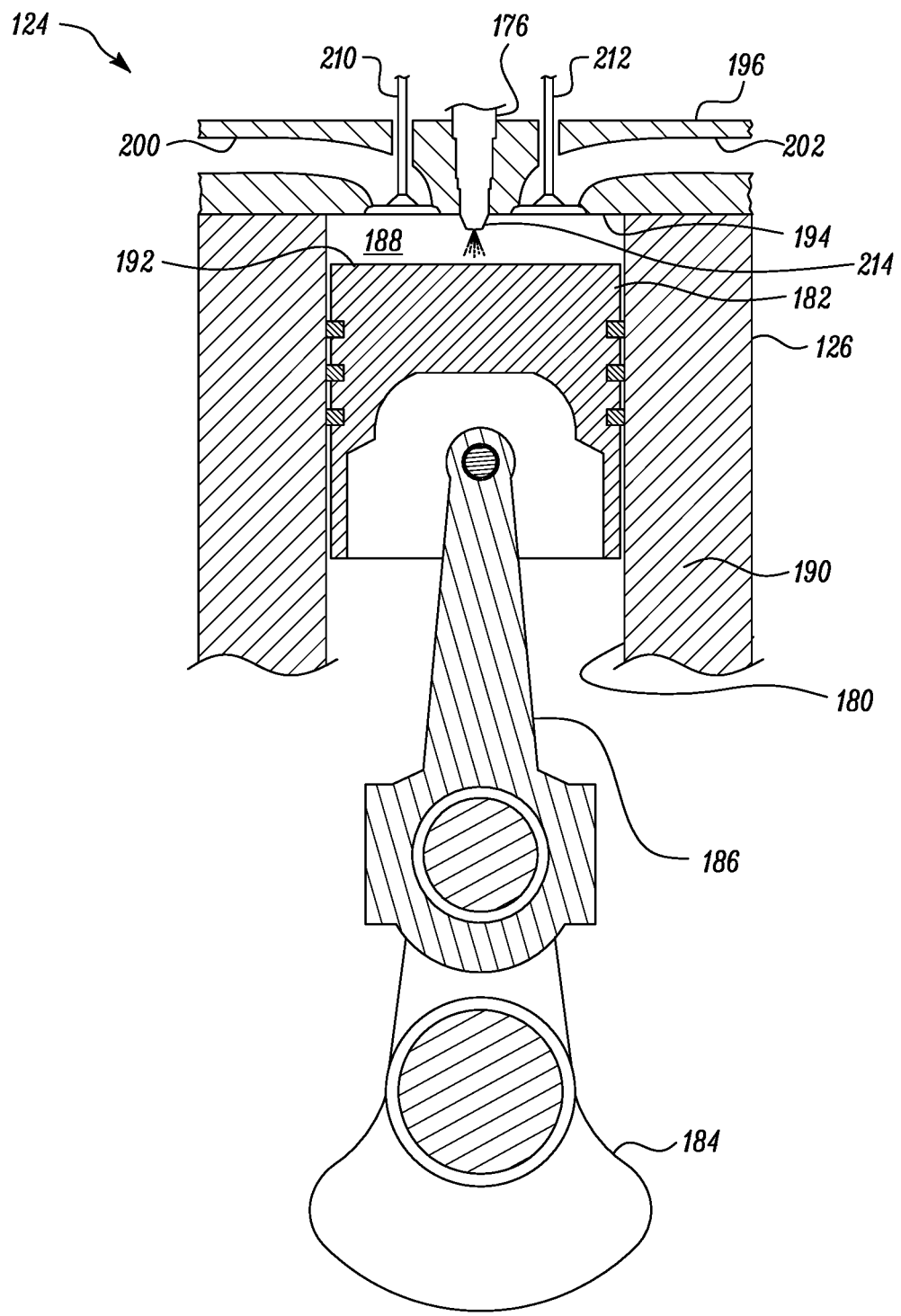
FIG. 2 is a cross-sectional view of a cylinder of an internal combustion engine of the engine system, in accordance with an embodiment of the disclosure.

Referring to FIG. 2, a cross-sectional view of a single cylinder 124, having a single fuel injector 176, is shown. For example, this single cylinder 124 may be either one of the first cylinders 124a or one of the second cylinders 124b.

The cylinder 124 includes a bore 180 and a piston 182 slidably disposed within the bore 180, adapted to reciprocate between a top dead center position and a bottom dead center position within the cylinder 124. The depiction provided in FIG. 2 may correspond to the piston 182 at the top dead center position within the cylinder 124. The piston 182 may be coupled to a crankshaft 184 through a connecting rod 186. A combustion chamber 188 may be defined by a radial sidewall 190, a crown 192 of piston 182, and a flame deck 194 of a cylinder head 196. The combustion chamber 188 may be configured to have a variable volume between a maximum volume and a minimum volume as the piston 182 reciprocates within the bore 180. It may be noted that in the bottom dead center position, the piston 182 is farthest from the cylinder head 196 and defines the maximum volume of the combustion chamber 188, while in the top dead center position, the piston 182 is closest to the cylinder head 196 and defines the minimum volume of the combustion chamber 188.

The cylinder head 196 may include an air intake port 200 and an exhaust port 202. The air intake port 200 may fluidly extend between the bore 180 and either the first air intake manifold 130 (see FIG. 1) or the second air intake manifold 134, while the exhaust port 202 may fluidly extend between the bore 180 and either the first exhaust manifold 132 or the second exhaust manifold 136 (see FIG. 1).

The cylinder 124 may include an air intake valve 210 and an exhaust valve 212. The air intake valve 210 may be used to open and close a passage defined by the air intake port 200 to regulate an entry of the compressed air into the combustion chamber 188. The exhaust valve 212 may be used to open and close a passage defined by the exhaust port 202 to regulate an exit of exhaust gas (resulting from a combustion of an air-fuel mixture), out of the combustion chamber 188. Use of a higher number of intake valves and exhaust valves per cylinder of the engine 102 is also possible.

Referring to FIGS. 1 and 2, the fuel injector 176 is configured to inject fuel into the combustion chamber 188, at specific times, for combustion. According to an embodiment, the fuel injector 176 may be positioned into the cylinder head 196, and the fuel injector's tip 214 may be extended into the combustion chamber 188 to provide fuel into the combustion chamber 188. In some implementations, the fuel injector 176 may be configured to receive an amount of the fuel from a fuel tank 216 (see FIG. 1), and for this purpose, a dedicated fuel line 218, including a fuel pump 219, (see FIG. 1) may extend between the fuel tank 216 and the fuel injector 176 so as to provide fuel flow from the fuel tank 216 to the fuel injector 176 (see fuel line 218 extending to each fuel injector 176 in FIG. 1).

In one implementation, the fuel injector 176 may be electronically operated. To this end, the fuel injector 176 may include a solenoid valve mechanism or a needle valve mechanism that allows fuel injection into the combustion chamber 188. By use of such mechanisms, it may also be possible to quantify a fuel amount that is injected into the combustion chamber 188. To this end, the fuel injector 176 may receive instructions from the control system 104, and, in some implementations, it is possible that an amount and an injection timing of fuel that is to be injected into the combustion chamber 188 may be determined by the control system 104.

The fuel injector 176 may use a camshaft and push rod arrangement (not shown) to generate a fuel injection pressure, but may use the control system 104 to control an amount of fuel injected into the combustion chamber 188. For example, a solenoid of the fuel injector 176 may receive voltage signals from the control system 104 to become energized, and the fuel injector 176 may inject fuel only while the solenoid is energized. In an embodiment, a timing of fuel injection may be controlled as well. Fuel injection types, such as a common rail fuel injection system, a system including hydraulically actuated electronically controlled unit injectors (HEUI), mechanically actuated electronically controlled unit injector (MEUI), and the like, may also be applied.

The control system 104 may be configured to control the engine 102, and, in particular, in response to an increase in the load on the engine 102. For the purpose of the present disclosure, it may be understood that an increase in the load on the engine 102 corresponds to a transient load condition on the engine 102 (also referred to as 'increased load condition'). In an exemplary embodiment of the present disclosure, the increased load condition may result from a near-instantaneous electrical load being applied to the electrical generator 108, such as may be encountered in a stand-by power application. The control system 104 includes a controller 250, which may be configured to detect the increased load condition of the engine 102. For such detection, the controller 250 may be configured receive signals from a variety of sources, such as sensors, storage devices, etc., with such signals being indicative of an increase in a load on the engine 102. In some scenarios, the load may be representative of a transient load on the engine 102, or an increased load on the engine 102.

In one implementation, the controller 250 may determine that a signal indicating a change in an engine speed is indicative of an increase in the load on the engine 102. This is because, at any instant, an additional load connected to the engine 102 may cause the engine speed to decrease until additional fuel and air are supplied to the engine 102. A decrease of the engine speed below a predefined threshold, within a specified period (i.e. an excessive rate of a decrease in the engine speed or a sudden decrease in the engine speed), may result in the controller 250 sense the increased load condition and initiate a response increasing the amount of fuel and air provided to the combustion chamber 188. The engine speed may be detected by an engine speed sensor 252 (see FIG. 1). In an embodiment, the engine speed sensor 252 may detect an angular velocity of the crankshaft 184. The controller 250 may receive data pertaining to the angular velocity of the crankshaft 184, and may accordingly determine a rate of change of the engine speed. If the rate of change of the engine speed is higher than a predefined rate of engine speed, the controller 250 may determine that a load is being applied. In some embodiments, the controller 250 may be associated with various other sensors and actuators of the engine 102, such as a torque sensor 256 (see FIG. 1), that participate in providing functions and various information to the controller 250, helping the controller 250 detect various parameters to in turn determine the increased load condition on the engine 102.

Based on the increased load condition, the controller 250 may facilitate increased fueling and air into the combustion chamber 188 of one or more of the first cylinders 124a and second cylinders 124b to maintain an overall engine output. To this end, the controller 250 may be configured to control the fuel injector 176 of one or more of the first cylinders 124a and second cylinders 124b to provide the increased fueling thereof. For example, the controller 250 may provide injection commands to the fuel injectors 176, associated with one or more of the first cylinders 124a and the second cylinders 124b, according to a fueling timing pattern. These commands (associated with the fueling timing pattern) may relate to determining a timing of fuel injection, a number of events of fuel injection, and a quantity of fuel injection.

According to an aspect of the present disclosure, the following fueling timing pattern may be used to respond to an increased load on the engine 102. The fueling timing pattern in one or more of the first cylinders 124a and the second cylinders 124b of the engine 102 helps increase thermal energy available in the exhaust gas discharged from the one or more of the first cylinders 124a and the second cylinders 124b to the turbocharger 106. The fueling timing pattern, described in detail below, includes an injection event occurring late enough in the combustion cycle to minimize the amount of work extracted by the piston 182. Instead, the thermal energy released by combustion is converted to heat, thereby raising exhaust temperature.

Figure 3:
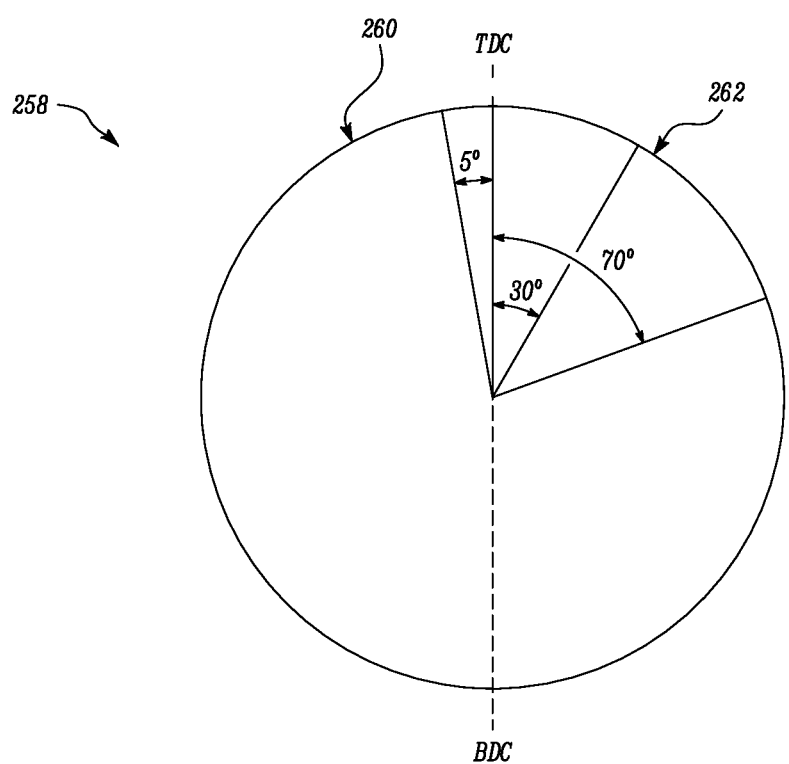
FIG. 3 is an injection timing diagram showing timings of different fuel injection events into the cylinder, in accordance with an embodiment of the disclosure.

Referring to FIG. 3, and according to the fueling timing pattern, the controller 250 is configured to initiate two fuel injection events, a first injection event 260 and a second injection event 262, into the combustion chamber 188 of one or more of the first cylinders 124a and the second cylinders 124b, during an engine operation cycle. The first injection event 260 includes the controller 250 controlling the fuel injector 176 to introduce a first predetermined quantity of fuel into the combustion chamber 188. This quantity of fuel is introduced at least 5 degrees before the piston 182 reaches the top dead center position, during a compression stroke of the piston 182. The second injection event 262 corresponds to the controller 250 controlling the fuel injector 176 to introduce a second predetermined quantity of fuel into the combustion chamber 188 not earlier than 30 degrees after the piston 182 moves away from the top dead center position, during an expansion stroke of the piston 182. In an embodiment, the controller 250 may initiate the second injection event 262, and facilitate the introduction of the second predetermined quantity of fuel by the fuel injector 176, not later than 70 degrees after a movement of the piston 182 from the top dead center position.

It may be noted that the two injection events (i.e. the first injection event 260 and the second injection event 262) introduce fuel into the combustion chamber 188 at two different times during the engine combustion cycle. For example, the first injection event 260 may correspond to a main fuel injection event, while the second injection event 262 may correspond to a late post fuel injection event. The first injection event 260 may facilitate execution of a power stroke of the piston 182, while the second injection event 262 may increase a temperature of the exhaust gas produced during the combustion cycle. Exhaust gas with increased temperature may be directed to one or more of the first exhaust manifold 132 and the second exhaust manifold 136, and then to the turbocharger 106, resulting in a relatively high temperature of the exhaust gas at the turbine inlet 152 (see FIG. 1). As a result, increased thermal energy may be available for extraction by the turbine portion 150 from the exhaust gas, resulting in increased operational speed of the turbocharger 106. This increased operational speed of the turbocharger 106 produces an increased speed of the compressor portion 156, which result in a proportionally higher air pressure boost at the compressor outlet 160 (see FIG. 1), in comparison to a single injection event.

In an embodiment, the controller 250 is configured to provide a specific quantity of the first predetermined quantity of fuel and a specific quantity of the second predetermined quantity of fuel based on the increase in the load. In one implementation, the specific quantity of the first predetermined quantity of fuel may be directly proportional to the increase in the load, while the specific quantity of the second predetermined quantity of fuel may be determined as a fixed predetermined value. For example, the specific quantity of the first predetermined quantity of fuel may be increased according to an increase in the load and decreased according to a decrease in the load, so as to meet a load requirement (or an increased load requirement) of the increased load condition.

Based on the increased load condition, additionally, or optionally, the controller 250 may be also configured to cutout or deactivate one or more cylinders (i.e. one or more of the first cylinders 124a or one or more of the second cylinders 124b) of the engine 102 to maximize an effect of the fueling timing pattern. At the same time, the controller 250 may control a functioning of the remaining cylinders—by keeping the remaining cylinders in an active state according to the fueling timing pattern. The terms 'cutout' or 'deactivate' as is used and applied herein in relation to any cylinder (i.e. any of the first cylinders 124a or second cylinders 124b) means to stop a supply of fuel to said cylinder, while the term 'active' used and applied in relation to any cylinder means to continue a fuel supply to the associated cylinder. In effect, therefore, a deactivation/activation of one or more cylinders of the engine 102 may correspond to a deactivation/activation of fuel injectors, such as fuel injector 176, associated with the cylinders (i.e. any of the first cylinders 124a or second cylinders 124b).

In an embodiment, a number of cylinders that need to be deactivated, a sequence of cylinder deactivation, and a duration of cylinder deactivation, may all be pre-determined and be stored within a memory of the controller 250. For example, a processing unit 254 within the controller 250 may refer to charts and models stored within the memory that may help establish the number of cylinders, out of the cylinders, that need to be deactivated, the sequence of cylinder deactivation, and/or the duration of cylinder deactivation. In one example, the number of cylinders that need to be deactivated may depend upon a measure of an increased load. For example, higher a measure of increase of the load, higher may be number of cylinders that may be deactivated. Nevertheless, a maximum number of cylinders that may be deactivated may be up to half of the total number of cylinders that are available in the engine 102. In an embodiment, the controller 250 may determine the number of cylinders to be deactivated based on, for example, one or more of engine speed, engine fueling, engine altitude, engine temperature and/or additional or different engine operating parameters. In another embodiment, the maximum number of cylinders, out of the cylinders, that may be deactivated may be half of the total number of the cylinders of the engine 102, while the other half may remain in an active state. In yet another embodiment, it is possible that one of the first cylinders 124a or the second cylinders 124b be altogether deactivated, while the other of the first cylinders 124a or second cylinders 124b be all kept in an active state. According to one exemplary aspect of the present disclosure, the controller 250 deactivates the whole of the second cylinders 124b and maintains whole of the first cylinders 124a in the active state.

Discussed below is an example of a cylinder deactivation pattern in a 3516® engine and C175-16® engine manufactured by Caterpillar Inc. The 3516® engine and C175-16® engine are 16-cylinder engines, and thus, the engine 102 may be representative of both these engines. Accordingly, the cylinders 124a, 124b may be representative of the cylinders in the 3516® and C175-16® engines. To explain aspects of this example with reference to engine 102, the cylinders 124a, 124b may be envisioned to represent an increasing number sequence, starting from the left-most cylinders 124a, 124b towards the right-most cylinders 124a, 124b, according to the configuration shown in FIG. 1. More particularly, the first cylinders 124a may be represented by sequentially increasing odd numbers from left to right, while the second cylinders 124b may be represented by sequentially increasing even numbers from left to right. According to the example, four cylinders may be deactivated at a time, with the following four patterns cycling between patterns on a regular basis—1, 3, 13, 15; 2, 4, 14, 16; 5, 7, 9, 11; and 6, 8, 10, 12. In an embodiment, a combination of eight cylinders may be deactivated—1, 3, 5, 7, 9, 11, 13, 15; and 2, 4, 6, 8, 10, 12, 14, 16.

Described below is yet another example of a cylinder deactivation pattern in a C175-20® engine manufactured by Caterpillar Inc. The C175-20® engine is a 20-cylinder V-configuration engine (unlike engine 102 which is a 16-cylinder engine). The odd numbers in this example represent cylinders in one bank of the C175-20® engine, while the even numbers represent cylinders in the other bank of the C175-20® engine. The odd numbers may sequentially increase from one side of the bank to other side of the bank, while the even numbers may similarly sequentially increase from the one side of the bank to the other side of the bank, as well. According to the example, a combination of ten cylinders may be deactivated—1, 3, 5, 7, 8, 9, 11, 13, 1517, 19; and 2, 4, 6, 8, 10, 12, 14, 16. In yet another embodiment, deactivation patterns of five cylinders may be possible—1, 3, 5, 7, 9; 2, 4, 6, 8, 10; 11, 13, 15, 17, 19; and 12, 14, 16, 18, 20.

The deactivation of the one or more of the first cylinders 124a or second cylinders 124b causes the remaining cylinders that are active and firing to increase fueling to maintain (or increase) overall engine power output. However, because fewer than all cylinders are firing, the non-firing or deactivated cylinders are still consuming power, for example, due to friction and compression of the air found therein, which decreases an overall engine efficiency. A decreased engine efficiency is reflected in an overall higher fueling amount for the same engine power output. A higher fueling translates into an increased energy supplied to the turbine portion 150, in the form high temperature (or enthalpy) of the exhaust gas. The increased temperature of the exhaust gas causes a higher energy conversion at the turbine portion 150 of the engine 102, which results in increased compressor work and, thus, higher engine boost (i.e. a boosted pressure of air) at the compressor outlet 160 that may be provided to the intake manifold (i.e. to both the first air intake manifold 130 and the second air intake manifold 134), and thus to the combustion chamber 188, enhancing engine output. With higher engine boost, the fuel injectors 176 of the active cylinders may inject more fuel for the same air/fuel ratio, which in turn provides greater instantaneous power capability for the same starting load of the engine 102 with relatively lean emissions.

In an embodiment, the controller 250 may be a microprocessor based device that may include power electronics, preprogrammed logic circuits, data processing circuits, associated input/output buses, volatile/non-volatile memory units, such as random access memory (RAM) that help process the signals received from one or more sensors, such as the engine sensor. The controller 250 may be implemented as an application-specific integrated circuit, or other logic device, and such devices being known to those with ordinary skill in the art. The controller 250 may form a portion of an electronic control module (ECM) of the engine 102, or any other control module associated with the engine 102, or may be configured as a stand-alone entity. Further, the processing unit 254, configured within the controller 250, may be configured to control an operation of each fuel injector 176 (see FIG. 1). Examples of the processing unit 254 include, but are not limited to, an X86 processor, a Reduced Instruction Set Computing (RISC) processor, an Application Specific Integrated Circuit (ASIC) processor, a Complex Instruction Set Computing (CISC) processor, an Advanced RISC Machine (ARM) processor or any other processor. It may be noted that the term "controller" as used herein is meant to include one, two, or more controllers, that may be associated with the engine.

INDUSTRIAL APPLICABILITY

During operation, the controller 250 may detect one or more engine parameters, such as a change in engine speed, as an indicator of an increase in the load, and thus detect the increase in the load. Additionally, or optionally, the controller 250 may use other parameters of the engine 102 to detect the increase in the load. In some cases, the controller 250 may interpret the change in engine speed as a change in load during an operation of the engine 102 within a predefined speed range, such as within an engine idle speed range. It is also possible in some cases that the controller 250 detects an increase in the engine load based on a request by an operator, for example, by a user of the engine 102 or by any control module associated with the engine 102.

Figure 4:
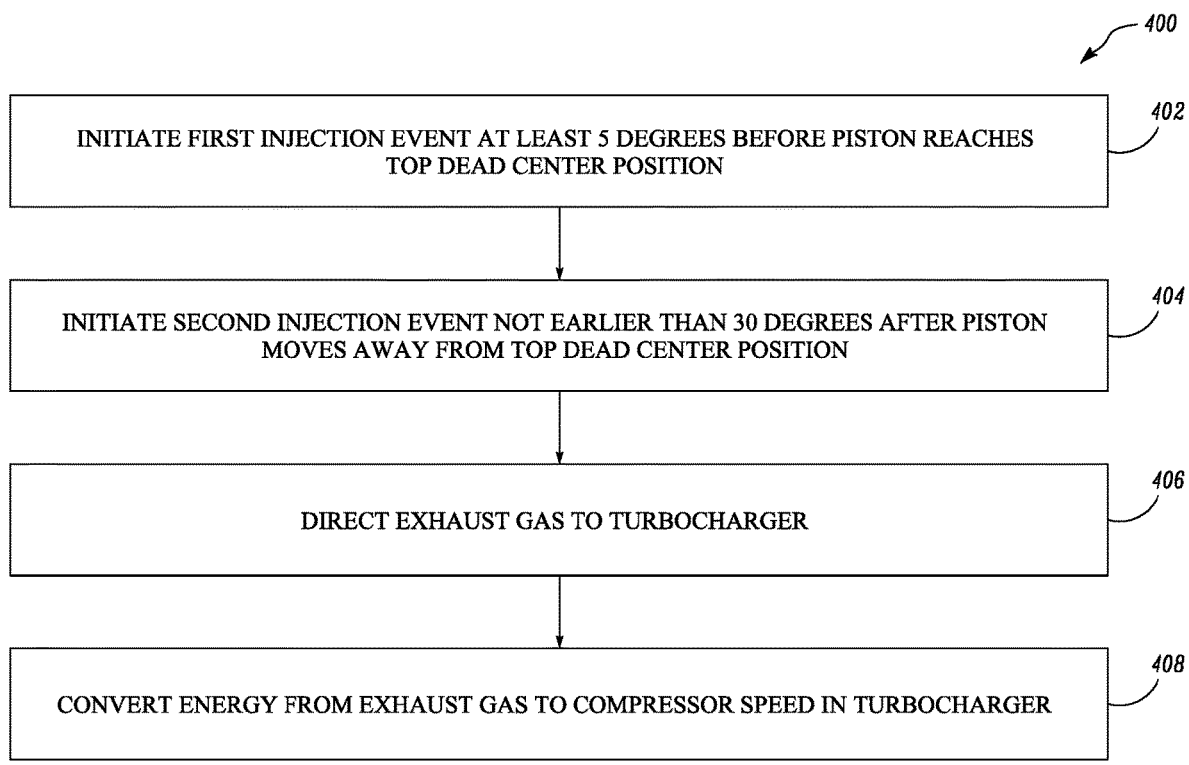
FIG. 4 is a flowchart illustrating an exemplary method of operating the engine, in accordance with an embodiment of the disclosure.

Based on the increased load condition, the fuel injectors 176 associated with one or more of the first cylinders 124a or the second cylinders 124b (or the of the cylinders that are active) are fed with a modified fueling command (i.e. according to the fueling timing pattern). The present disclosure discusses the fueling timing pattern also as a method for controlling the engine 102 in response to the increase in the load on the engine 102. This method is depicted and discussed by way of a flowchart 400 in FIG. 4, and has been discussed further below in conjunction with FIGS. 1, 2, and 3.

After sensing an increased load condition, at step 402, the controller 250 initiates the first injection event 260. The first injection event 260 includes introducing a first predetermined quantity of fuel into the combustion chamber 188 at least 5 degrees before the piston 182 reaches the top dead center position.

At step 404, the controller 250 initiates the second injection event 262. The second injection event 262 includes introducing a second predetermined quantity of fuel into the combustion chamber 188 not earlier than 30 degrees after the piston 182 moves away from the top dead center position. In an embodiment, the second injection event 262 occurs not later than 70 degrees after a movement of the piston 182 from the top dead center position. An injection timing diagram 258 of the first injection event 260 and the second injection event 262 have been schematically depicted in FIG. 3 in terms of a crank angle associated with a movement of the crankshaft 184.

In one implementation, the first predetermined quantity of fuel may be ignited by compression and combusted. It may be noted that while the second predetermined quantity of fuel is introduced into the combustion chamber 188, the combustion of the first predetermined quantity of fuel may still be in progress. An ongoing combustion of the first predetermined quantity of fuel may ignite the second predetermined quantity of fuel as well. Such combustion enables the piston 182 to execute a power stroke (i.e. the piston 182 moves from the top dead center position to the bottom dead center position) during an operational cycle of the engine 102. While the combustion of the first predetermined quantity of fuel may primarily provide power to move the piston 182, a combustion of the second predetermined quantity of fuel may provide only limited power to effectuate piston movement. However, the combustion of the second predetermined quantity of fuel results in the exhaust gas having an additional amount of thermal energy.

It may be noted that the amount of thermal energy in the exhaust gas as a result of combusting the second predetermined quantity of fuel is greater than an amount of thermal energy that would have been available by combusting the first predetermined quantity of fuel alone. This is because the thermal energy produced by the first injection event 260 is primarily spent to move the piston 182, while the thermal energy produced by the second injection event 262 is primarily manifested as heat, resulting in an increased exhaust gas temperature.

In an exhaust stroke of the piston 182, the piston movement is reversed and the piston 182 moves to the top dead center position from the bottom dead center position. In the process of movement to the top dead center position, the piston 182 pushes the exhaust gas out through the exhaust port 202.

At step 406, the exhaust gas from the exhaust port 202 is directed to the turbocharger 106, and more specifically, towards the turbine inlet 152 of the turbine portion 150. As the exhaust gas is received by the turbocharger 106, the turbine portion 150 extracts a portion of the thermal energy from the exhaust gas to be driven by a flow of the exhaust gas.

At step 408, the drive of the turbine portion 150 results in an equivalent and/or a synchronous drive of the compressor portion 156. Accordingly, the energy from the exhaust gas is converted to compressor speed in the turbocharger 106.

It may be noted that the thermal energy of the exhaust gas obtained by combusting the second predetermined quantity of fuel results in the turbine portion 150 extracting a portion of said thermal energy from the exhaust gas, and thus driving the compressor portion 156 at a speed greater than a speed that may have been obtained by combusting the first predetermined quantity of fuel alone. As a result, the compressor portion 156 may draw in commensurately higher quantity of air from the ambient environment 170, resulting in greater boost pressure from the compressor outlet 160, and thus within the intake manifold (i.e. within both the first air intake manifold 130 and the second air intake manifold 134).

Additionally, or optionally, as the increased load condition is detected, the controller 250 may deactivate at least one cylinder out of the multiple cylinders of the engine 102. Deactivating at least one cylinder of the engine 102 means that the controller 250 may electronically prevent fuel injections by the fuel injector 176 associated with the deactivated cylinder. In so doing, no further fueling is performed into the deactivated cylinder for a prescribed period. In some implementations, the deactivated cylinders continue to remain deactivated until an output provided by the remaining active cylinders (that may operate on the fueling timing pattern) meets the increased load requirement of the increased load condition. Additionally, or optionally, the method depicted by the flowchart 400 may be repeated until the engine 102 meets the increased load requirement of the increased load condition. Once the increased load requirement is met by the active cylinders, the deactivated cylinders may resume normal operation.

In one example experiment conducted on a conventional electric power standby application engine, it was observed that by following the above method, a boost pressure available within the intake manifold (such as both the first air intake manifold 130 and the second air intake manifold 134) of an engine, such as engine 102, increased by 10 to 20 kilo pounds-per-inch (KPI). This commensurately translated to said engine achieving a load percentage of up to 48.5% from 0% load in a single stage of load application. Such a response enhanced said engine's response during the increased load condition. Moreover, the fueling timing pattern, according to the aspects of the present disclosure, facilitates additional volume of compressed air (and in turn more pressure) to pass through the intake manifold (such as both the first air intake manifold 130 and second air intake manifold 134), and thus into the combustion chamber 188 for combustion, making the air-fuel ratio apt for the introduction of additional fuel in the form of the second injection event 262, thus mitigating emissions and visible smoke that may have been generated had the volume of compressed air not increased.

Additionally, in an exemplary scenario, with one or more of the cylinders being cutout, it becomes easier for the fuel injectors 176 of the active cylinders to more accurately regulate a quantity of fuel. This is because, during a low load condition, a quantity of fuel slated for injection may be too low for certain fuel injectors to accurately quantify and inject into the combustion chamber 188. With one or more cylinders cutout/deactivated, the fuel injectors 176 of the active cylinders are provided with a higher quantity of fuel, since the fuel that were to be injected into the deactivated cylinders may now be made available for injection into the active cylinders. A regulation of a higher quantity of fuel is easier than to regulate a reduced quantity of fuel.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. A method for controlling a diesel compression engine in response to an increase in a load on the engine in the form of a transient load condition resulting from application of a near-instantaneous load, the diesel compression engine including a cylinder having a piston slidably disposed therein between a top dead center position and a bottom dead center position, the cylinder and the piston defining a combustion chamber, the method comprising:
   responsive to detection of the increase in the load of the diesel compression engine in the form of the transient load condition resulting from application of the near-instantaneous load:
      performing a first injection event within an engine compression ignition cycle, the first injection event including introducing a first predetermined quantity of fuel into the combustion chamber at least 5 degrees before the piston reaches the top dead center position; and
      performing a second injection event within said engine compression ignition cycle, with combustion of the first injection event still in progress, the second injection event including introducing a second predetermined quantity of fuel into the combustion chamber not earlier than 30 degrees after the piston moves away from the top dead center position and before starting an engine compression ignition cycle immediately subsequent to said engine compression ignition cycle,
   wherein the diesel compression engine includes a plurality of said cylinders, the method further comprising deactivating, for the first injection event and the second injection event for said engine compression ignition cycle, at least one of the plurality of cylinders while maintaining a remaining plurality of cylinders in an active state to introduce the first and second predetermined quantities of fuel into the combustion chambers of the maintained remaining active state cylinders for said engine compression ignition cycle, and
   wherein said deactivating includes stopping supply of the fuel to said at least one of the plurality of cylinders.

2. The method of claim 1 further comprising combusting the second predetermined quantity of fuel in the combustion chamber, resulting in exhaust gas having an amount of thermal energy.

3. The method of claim 2 further comprising:
   directing the exhaust gas to a turbocharger, the turbocharger having a turbine portion including a turbine inlet and a turbine outlet, and a compressor portion driven by the turbine portion and including a compressor inlet and a compressor outlet, wherein the exhaust gas is directed to the turbine inlet; and
   extracting a portion of the thermal energy from the exhaust gas by the turbine portion.

4. The method of claim 3, wherein the amount of thermal energy in the exhaust gas as a result of combusting the second predetermined quantity of fuel is greater than an amount of thermal energy that would have been available by combusting the first predetermined quantity of fuel alone, resulting in the turbine portion driving the compressor portion at a speed greater than a speed by combusting the first predetermined quantity of fuel alone, thereby resulting in greater boost pressure from the compressor outlet.

5. The method of claim 1, wherein the second injection event occurs not later than 70 degrees after a movement of the piston from the top dead center position.

6. The method of claim 1, wherein half of the plurality of cylinders are deactivated and half of the plurality of cylinders are active.

7. The method of claim 1 further including detecting, by a controller, the increase in the load and calibrating a specific quantity of the first predetermined quantity of fuel and a specific quantity of the second predetermined quantity of fuel based on the increase in the load.

8. The method of claim 1, wherein a quantity of the first predetermined quantity of fuel is directly proportional to the increase in the load, while a quantity of the second predetermined quantity of fuel is determined as a fixed predetermined value.

9. A control system for controlling a diesel compression engine in response to an increase in a load on the diesel compression engine in the form of a transient load condition resulting from application of a near-instantaneous load, the diesel compression engine including a cylinder having a piston slidably disposed therein between a top dead center position and a bottom dead center position, the cylinder and the piston defining a combustion chamber, the control system comprising:
a controller configured to
control performance of, responsive to detection of the increase in the load of the diesel compression engine in the form of the transient load condition resulting from application of the near-instantaneous load, a first injection event within an engine compression ignition cycle, the first injection event including introducing a first predetermined quantity of fuel into the combustion chamber at least 5 degrees before the piston reaches the top dead center position, and
control performance of a second injection event within said engine compression ignition cycle, with combustion of the first injection event still in progress, the second injection event including introducing a second predetermined quantity of fuel into the combustion chamber not earlier than 30 degrees after the piston moves away from the top dead center position and before starting an engine compression ignition cycle immediately subsequent to said engine compression ignition cycle,
wherein the diesel compression engine includes a plurality of said cylinders, and the controller is further configured to deactivate, for the first injection event and the second injection event for said engine compression ignition cycle, at least one of the plurality of cylinders while maintaining a remaining plurality of cylinders in an active state to introduce the first and second predetermined quantities of fuel into the combustion chambers of the maintained remaining active state cylinders for said engine compression ignition cycle, and
wherein, when said at least one of the plurality of cylinders is deactivated no fuel is supplied to said at least one of the plurality of cylinders.

10. The control system of claim 1, wherein the second predetermined quantity of fuel is combusted in the combustion chamber, resulting in exhaust gas having an amount of thermal energy.

11. The control system of claim 10,
wherein the diesel compression engine further includes a turbocharger, the turbocharger having a turbine portion including a turbine inlet and a turbine outlet, and a compressor portion driven by the turbine portion and including a compressor inlet and a compressor outlet, wherein the exhaust gas is directed to the turbine inlet and a portion of the thermal energy from the exhaust gas is extracted by the turbine portion, and
wherein the amount of thermal energy in the exhaust gas as a result of combusting the second predetermined quantity of fuel is greater than an amount of thermal energy that would have been available by combusting the first predetermined quantity of fuel alone, resulting in the turbine portion driving the compressor portion at a speed greater than a speed by combusting the first predetermined quantity of fuel alone, thereby resulting in greater boost pressure from the compressor outlet.

12. The control system of claim 9, wherein the controller is configured to initiate the second injection event not later than 70 degrees after a movement of the piston from the top dead center position.

13. The control system of claim 9, wherein the controller is configured to detect the increase in the load and calibrate a specific quantity of the first predetermined quantity of fuel and a specific quantity of the second predetermined quantity of fuel based on the increase in the load.

14. An engine system, comprising:
a diesel compression engine including a cylinder having a piston slidably disposed therein between a top dead center position and a bottom dead center position, the cylinder and the piston defining a combustion chamber; and
a controller configured to
detect an increase in a load of the diesel compression engine in the form of a transient load condition resulting from application of a near-instantaneous load,
control performance of, responsive to detection of the increase in the load of the diesel compression engine in the form of the transient load condition resulting from application of the near-instantaneous load, a first injection event within an engine compression ignition cycle, the first injection event including introducing a first predetermined quantity of fuel into the combustion chamber at least 5 degrees before the piston reaches the top dead center position, and
control performance of a second injection event within said engine compression ignition cycle, with combustion of the first injection event still in progress, the second injection event including introducing a second predetermined quantity of fuel into the combustion chamber not earlier than 30 degrees after the piston moves away from the top dead center position, and not later than 70 degrees after the piston moves away from the top dead center position and before starting an engine compression ignition cycle immediately subsequent to said engine compression ignition cycle,
wherein the diesel compression engine includes a plurality of said cylinders, and the controller is further configured to deactivate at least one of the plurality of cylinders while maintaining a remaining plurality of cylinders in an active state for the first injection event and the second injection event for said engine compression ignition cycle, and
wherein, when the at least one of the plurality of cylinders is deactivated no fuel is introduced into said at least one of the plurality of cylinders.

15. The engine system of claim 14 further including a turbocharger having a turbine portion including a turbine inlet and a turbine outlet, and a compressor portion driven by the turbine portion and including a compressor inlet and a compressor outlet, wherein the second predetermined quantity of fuel combusted in the combustion chamber results in exhaust gas having an amount of thermal energy, the exhaust gas being directed to the turbocharger, and
wherein the amount of thermal energy in the exhaust gas as a result of combusting the second predetermined quantity of fuel is greater than an amount of thermal energy that would have been available by combusting the first predetermined quantity of fuel alone, resulting in the turbine portion driving the compressor portion at a speed greater than a speed by combusting the first predetermined quantity of fuel alone, thereby resulting in greater boost pressure from the compressor outlet.

16. The engine system of claim 14, wherein the controller is configured to deactivate half of the plurality of cylinders and maintain half of the plurality of cylinders in the active state.

17. The engine system of claim 14, wherein the controller is configured to
   determine a quantity of the first predetermined quantity of fuel as being directly proportional to the increase in the load, and
   determine a quantity of the second predetermined quantity of fuel as a fixed predetermined value.

* * * * *